US010864857B1

(12) United States Patent
Hollis et al.

(10) Patent No.: US 10,864,857 B1
(45) Date of Patent: Dec. 15, 2020

(54) MULTI-WEAPON RACK FOR COMBAT VEHICLE

(71) Applicant: U.S. Government as Represented by the Secretary of the Army, Dover, NJ (US)

(72) Inventors: Michael Hollis, Flanders, NJ (US); Christopher Mougeotte, Westminster, MD (US); Jeffrey Van Derveer, Randolph, NJ (US); Nicholas Stolten, Bangor, PA (US); Kris Mayer, Blairstown, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/387,868

(22) Filed: Apr. 18, 2019

Related U.S. Application Data

(63) Continuation-in-part of application No. 15/465,822, filed on Mar. 22, 2017, now abandoned.

(51) Int. Cl.
*B60R 7/04* (2006.01)
*B60R 7/14* (2006.01)

(52) U.S. Cl.
CPC . *B60R 7/14* (2013.01); *B60R 7/04* (2013.01)

(58) Field of Classification Search
CPC .. B60R 9/00; B60R 11/00; B60R 7/14; B60R 9/048; B60R 2011/0087; F41A 23/00; F41A 23/24; F41A 23/26; F41A 23/50; F41F 23/14; B65D 85/00; Y10S 428/911; F41H 11/06
See application file for complete search history.

(56) References Cited

U.S. PATENT DOCUMENTS

| | | | | | |
|---|---|---|---|---|---|
| 3,806,010 | A | * | 4/1974 | Utigard | B62J 9/00 224/421 |
| 4,475,247 | A | * | 10/1984 | Lee | F41C 33/06 2/2.5 |
| 5,996,865 | A | * | 12/1999 | Bissey | B60R 7/043 206/37 |
| 8,678,655 | B1 | * | 3/2014 | Mougeotte | F16C 19/522 384/126 |
| 8,910,559 | B1 | * | 12/2014 | Berman | F41H 5/263 89/36.08 |
| D849,597 | S | * | 5/2019 | Kiel | D12/12 |
| D860,046 | S | * | 9/2019 | Kiel | D12/12 |

(Continued)

*Primary Examiner* — Brian D Nash
(74) *Attorney, Agent, or Firm* — Michael C. Sachs

(57) ABSTRACT

A weapon stowage and mounting system for a military vehicle, wherein the weapon stowage and mounting system secures a weapon such as an M16 or M249 emplaced therein and retains such weapon from flying about as a secondary projectile in the event of a vehicle roll over, vehicle collision or vehicle blast event, The weapon stowage and mounting system allows for stowage of a weapon with loaded ammunition magazines, grenade launchers, forward hand grips, and/or rails and scopes still attached to the weapon, thus allowing maintenance of constant mission readiness. The weapon stowage and mounting system also includes a panel of UMWPE material that is positioned in line with the muzzle of a stowed weapon to fully capture a bullet in the event of an accidental discharge of the weapon.

9 Claims, 6 Drawing Sheets

(56) References Cited

U.S. PATENT DOCUMENTS

Figure 1A:
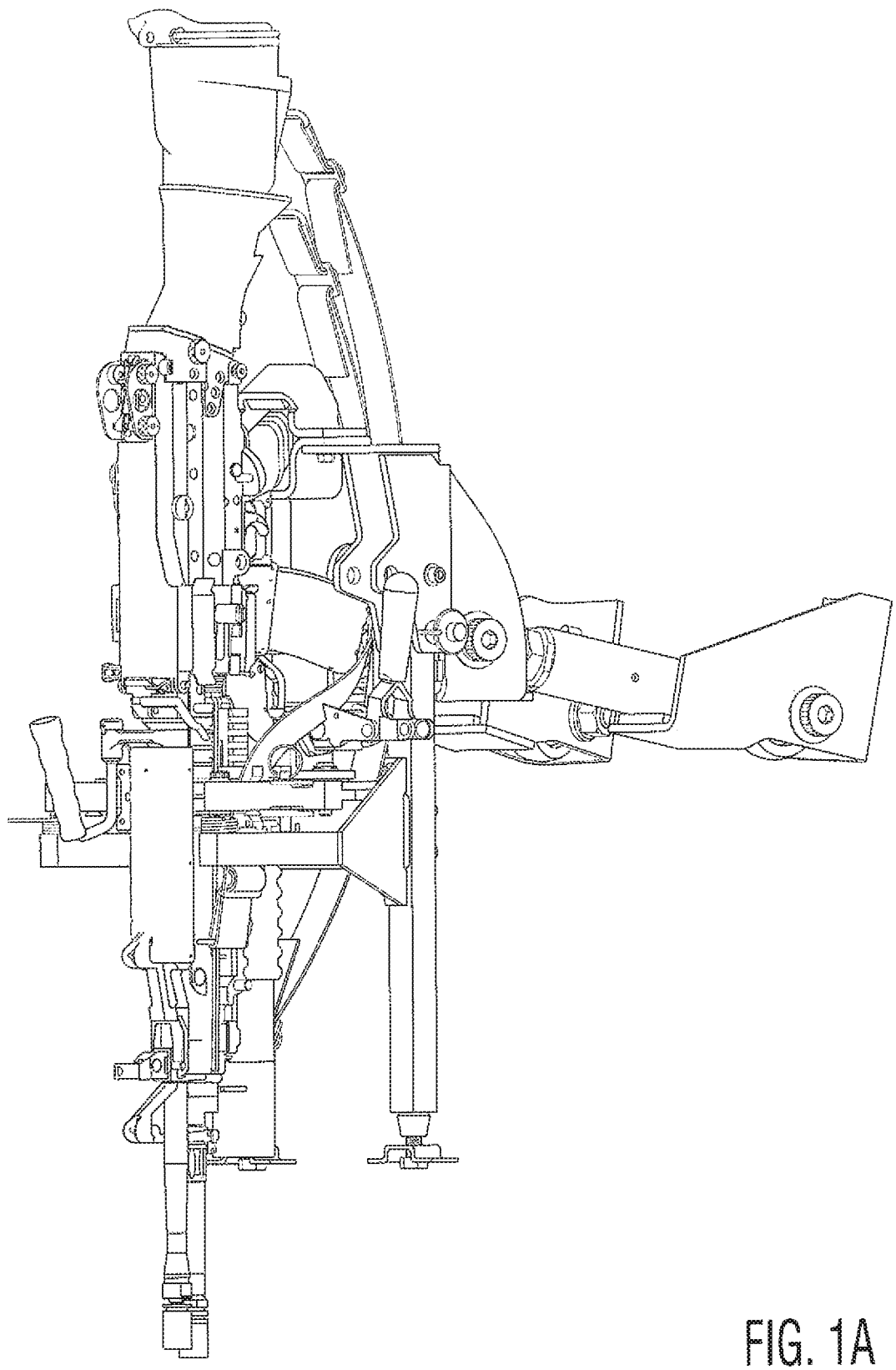

| | | | | |
|---|---|---|---|---|
| 2003/0127481 A1* | 7/2003 | Gantert | ............... | B60R 7/14 224/401 |
| 2003/0150972 A1* | 8/2003 | Murray | ............... | B60R 7/14 248/682 |
| 2004/0112190 A1* | 6/2004 | Hollis | ............... | B27B 5/29 83/13 |
| 2005/0241468 A1* | 11/2005 | Borgwarth | ............... | F41A 23/26 89/40.02 |
| 2006/0225567 A1* | 10/2006 | Balbo | ............... | F41A 23/26 89/42.02 |
| 2006/0266208 A1* | 11/2006 | Jean-Francois | ............... | F41A 23/26 89/37.13 |
| 2011/0290837 A1* | 12/2011 | Smith | ............... | B60R 7/14 224/413 |
| 2014/0097222 A1* | 4/2014 | Robinson | ............... | B60R 7/14 224/401 |
| 2014/0263107 A1* | 9/2014 | Arabian | ............... | F41C 33/06 211/8 |
| 2015/0129440 A1* | 5/2015 | Abascal | ............... | F41C 33/06 206/317 |
| 2015/0284081 A1* | 10/2015 | Cook | ............... | B60R 7/14 89/37.16 |
| 2016/0238337 A1* | 8/2016 | Hull | ............... | B60R 7/14 |
| 2017/0332783 A1* | 11/2017 | Setina | ............... | B60R 7/14 |
| 2017/0350672 A1* | 12/2017 | Masteller | ............... | F41A 23/18 |
| 2017/0361776 A1* | 12/2017 | Thorimbert | ............... | B60R 7/14 |
| 2017/0361777 A1* | 12/2017 | Bornais | ............... | B60R 7/14 |
| 2017/0363379 A1* | 12/2017 | Zalavari | ............... | F41A 17/02 |
| 2018/0170268 A1* | 6/2018 | Fisher | ............... | B60R 7/14 |

\* cited by examiner

MULTI-WEAPON RACK FOR COMBAT VEHICLE

CONTINUING DATA

This application is a continuation in part of application Ser. No. 15/465,822 filed Mar. 22, 2017 entitled "MULTI-WEAPON RACK FOR COMBAT VEHICLE", by the same inventors, and commonly assigned. The entire file wrapper contents of that parent case are hereby incorporated by reference.

STATEMENT OF GOVERNMENT INTEREST

The inventions described herein may be made, used, or licensed by or for the U.S. Government for U.S. Government purposes.

BACKGROUND OF THE INVENTION

Military services seek improved devices to serve as individual weapons stowage ("IWS") racks in newer personnel transport vehicles. Features sought include that the rack must accommodate a variety of weapons, such as the M4 Carbine, M16 Rifle Variants and the M249 Squad Automatic Weapon. Additionally, as vehicles are required to be more blast resistant, such rack must also be able to secure weapons during a blast or roll over event, so that the weapon does not become, e.g., a secondary projectile. Further, weapons must be able to be stowed in a loaded state, with the intent of a possible quick deployment. Current products that could be used to store weapons in vehicles do not assure that the weapon will remain secure during a blast or roll over event. Additionally, none provide that an individual can leave his choice of accessories, fully attached, onto a weapon while the weapon is stored on a proposed rack.

BRIEF SUMMARY OF THE INVENTION

The present invention is designed to rapidly secure multiple types of weapons utilized by the Military, specifically, the M4, M16 and the M249, e.g. All weapons could have various sights or lights mounted to the top side or under side of the weapon. Both the M4 and the M16 could for example be equipped with an M203 grenade launcher attached to the underside of the weapon. In addition the weapons could have Picatinny rails mounted thereon, in addition to the standard hand guard that is on the weapon. All weapons would be loaded with an ammunition magazine, except for the M249 which is a belt fed ammunition type weapon, The present invention positively secures a weapon in the event of a blast, or of a vehicle roll over. In the event of a blast from a mine or improvised explosive device (IED), for example, the actual weapon would remain secure and not become a secondary projectile within the vehicle, e.g. Additionally, the invention contains a means of capturing a bullet if a weapon accidentally discharges while the weapon is secured in the rack of this invention, Finally, the invention will allow for rapid stowage and removal of a weapon so that soldiers can exit the vehicle quickly with their weapons in hand.

BRIEF DESCRIPTION OF THE INVENTION

Conceptually to this invention, there are a series of clamps with which one may quickly secure different parts of a weapon. The rifle primarily is stacked in a downward facing position with the barrel muzzle facing downward. The grip stock of the downward aimed rifle is first placed into a cradle (for the grip stock), and a top most first toggle clamp, or latch, is locked in place there at the grip stock. An important feature of the invention is to insure that empty spaces are provided so that all expected attachments on a weapon will have ample space and not collide with any other parts of the rack or other items. As but one example of this foresight, there is space so that the magazine of the M4 or the M16 will fit through an opening in the rack, below the abovementioned cradle. The M249, which is differently constructed, will not need to interface with this feature, but in any event will not be hampered by any rack parts, in any way. The hand guard for a particular weapon will next be located by the soldier within an adjustable platen which is mounted permanently as a part of a lower caliper grip, of the rack of this invention. Prior to emplacing the hand guard, the platen needs to be adjusted on the caliper grip, for the specific weapon. The current design of this invention includes a quick release pin-and-hole placement means to adjust the platen. After the soldier locates the hand guard in the platen on the caliper grip, a (second) toggle clamp is locked to secure the caliper grip about the hand guard. As was mentioned before, the design of the rack parts are such as to leave empty spaces to accommodate any attachments which are normally mounted on the weapons. Here too, this side clamping of the caliper grip with the (second) toggle clamp still allows the soldier to leave various equipment(s) attached to the top-side or to the under-side of the weapon while it is in the rack of this invention. Finally, the invention also incorporates a bullet catch box which the barrel muzzle of the weapon extends into, whenever the weapon is mounted into the rack of this invention. If a weapon were to be accidentally discharged while the weapon is mounted in the rack of this invention, then the bullet would be captured in the bullet catch box. The bullet catch box comprises a block of Ultra High Molecular Weight Polyethylene (UMWPE) ballistic panel, which has the property that it can actually capture a moving bullet, and then contain it.

OBJECTS OF THE INVENTION

Accordingly, it is an object of the present invention to provide a weapon stowage device for a vehicle, wherein the stowage device secures a weapon emplaced therein and retains such weapon from flying about as a secondary projectile in the event of a vehicle roll over, vehicle collision or vehicle blast event.

Another object of the present invention is to provide a weapon stowage device which has means to secure the weapon at the weapon's hand guard, and means to also secure the weapon at the weapon's grip stock, simultaneously.

It is a further object of the present invention to provide a weapon stowage device that can accommodate automatic weapons of various types, by adjusting a grip stock clamp and a caliper grip of the weapon stowage device.

It is yet another object of the present invention to provide a weapon stowage device that allows for stowage of a weapon with various equipment still attached to the weapon and without need to detach any such equipment, thus allowing the weapon to maintain constant mission readiness.

It is a still further object of the present invention to provide a weapon stowage device that allows for stowage of a weapon with a loaded magazine still remaining in the weapon, thus allowing the weapon to maintain constant mission specific readiness.

It is a yet other object of the present invention to provide a weapon stowage device wherein the weapon stowage device incorporates a ballistic panel of UMWPE material that is positioned in line with the muzzle of the weapon, which ballistic panel will fully capture a bullet in the event of an accidental discharge of the weapon.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF DRAWINGS

Figure 1B:
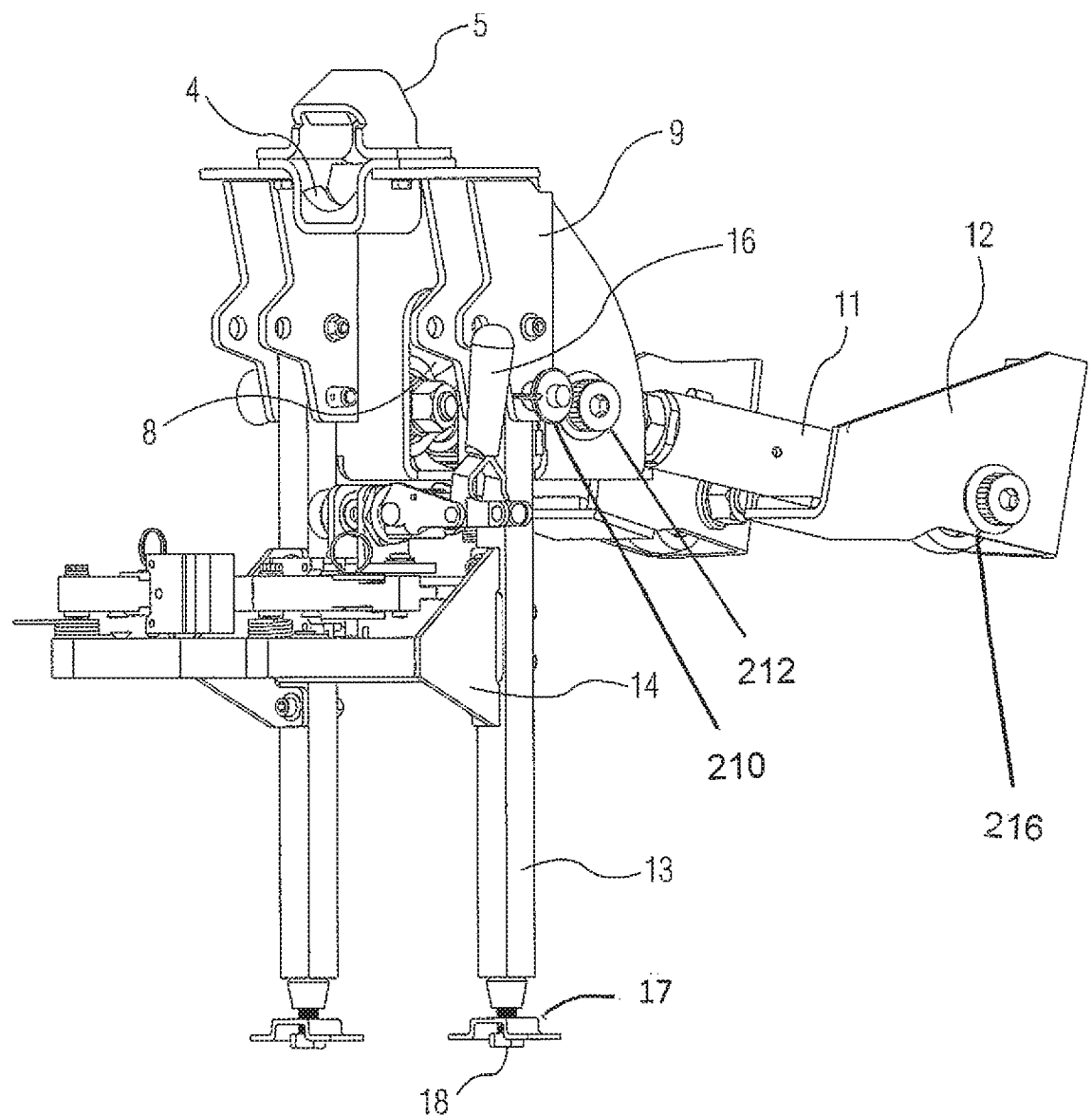

FIG. 1A shows the stowage invention with an M16, "1", secured, or else instead with an M249, "2", secured, and FIG. 1B shows the stowage invention without any weapon emplaced.

Figure 2:
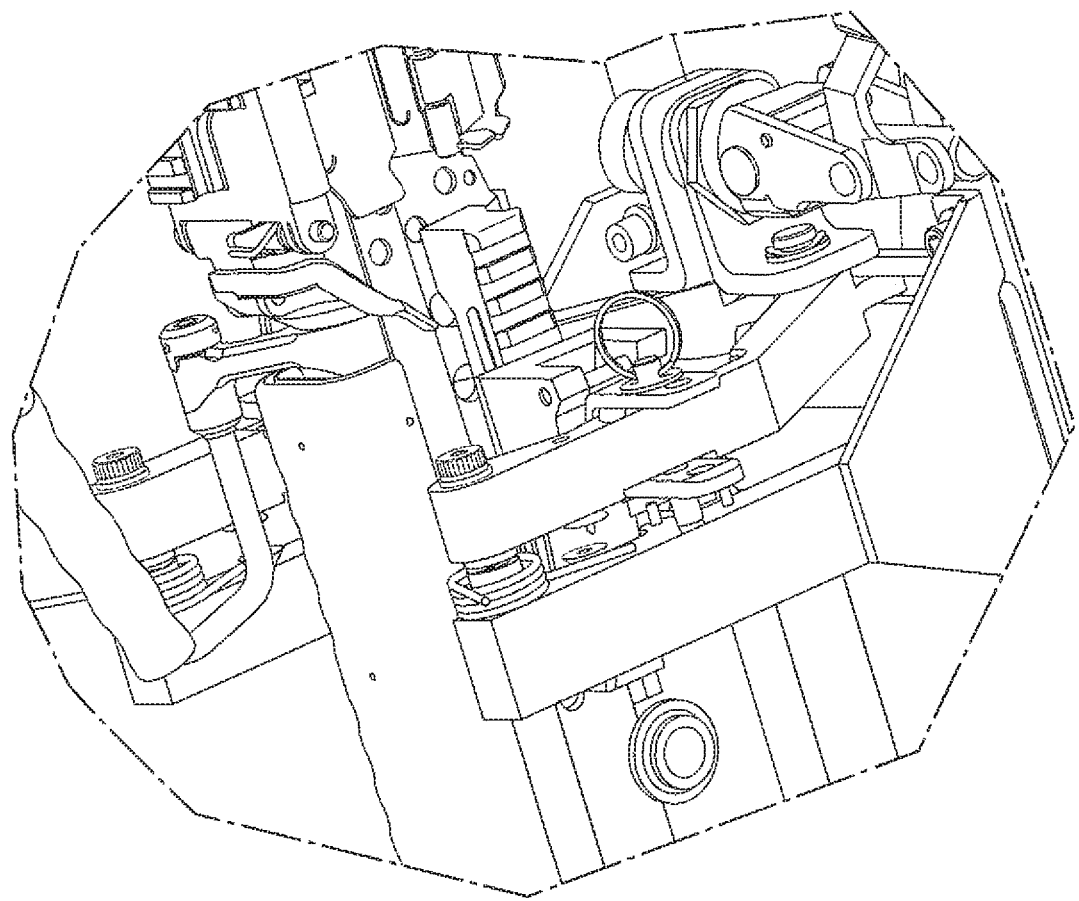

FIG. 2 is a detailed view of the caliper grip 14 of the invention, and shows a detailed section with caliper arm 19 positioned such that platen 20 clamps directly onto the side mounted Picatinny rail 21 of the weapon.

Figure 3:
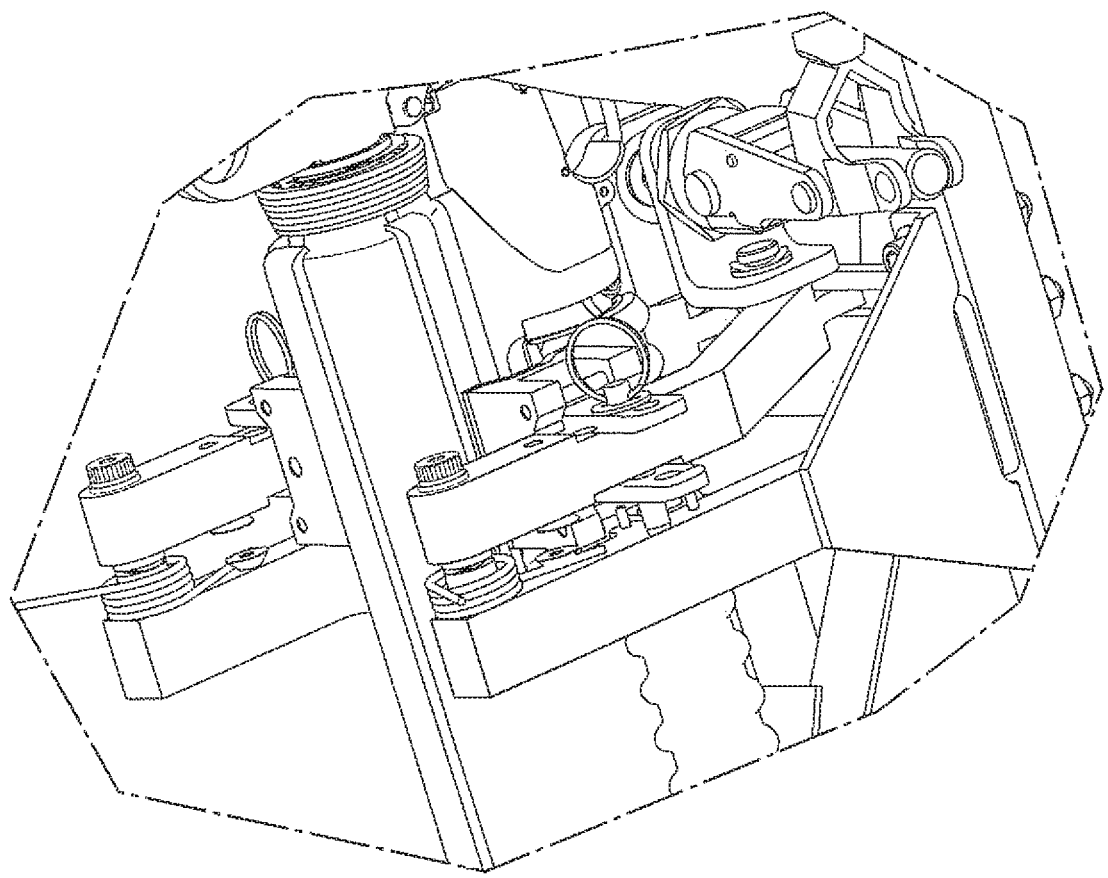

FIG. 3 demonstrates the caliper grip 14 of the invention with a section thereof in detail with the caliper platen 20 adjusted to accommodate an M16, allowing the platen 20 to secure the hand guard 5 of the weapon.

Figure 4:
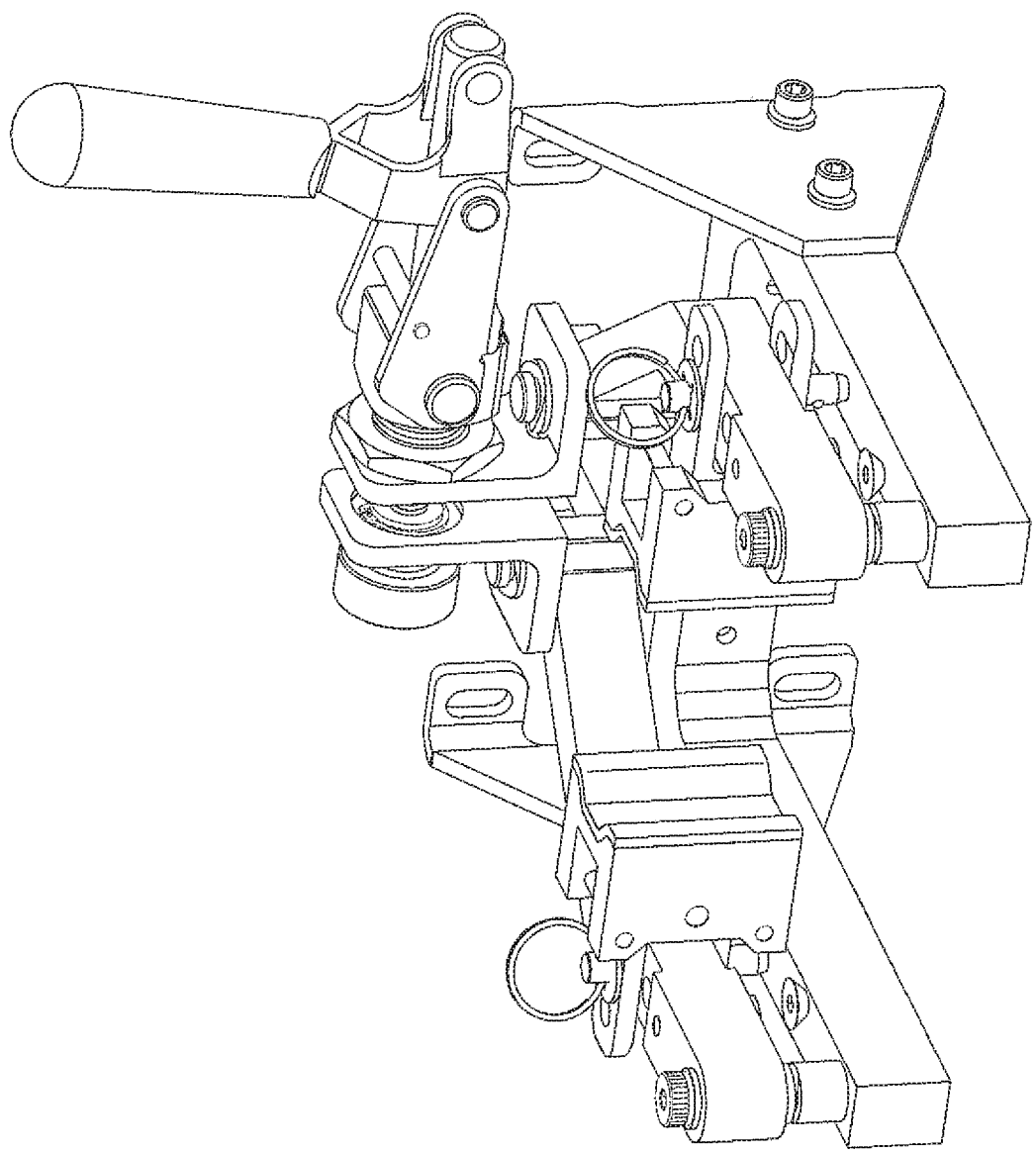

FIG. 4 depicts the caliper grip 14, specifically the adjustability thereof, which allows various types of weapons to be secured.

Figure 5:
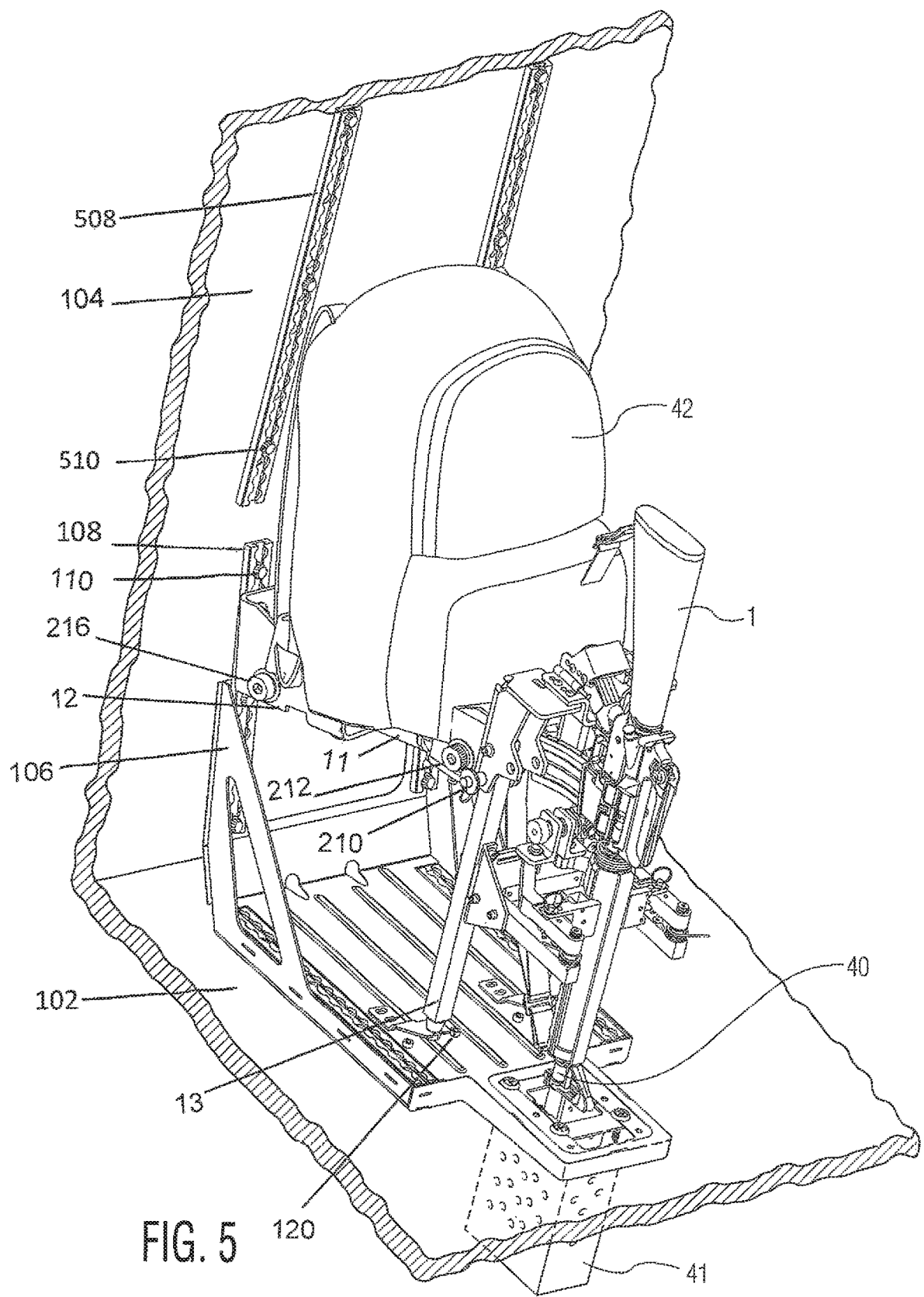

FIG. 5 displays the weapon stowage invention, with an M16 weapon, in a partial vehicle setting which illustrates a bullet arresting aspect of the invention.

It shows a catch box having a bullet catch plate of Ultra High Molecular Weight Poly Ethylene polymer that can capture a moving bullet, if fired inadvertently.

DETAILED DESCRIPTION OF THE INVENTION

FIG. 1A shows the invention with an M16, "1", secured, and which could also secure an M249, e.g. FIG. 1B shows the invention without a weapon emplaced. FIG. 1A illustrates that the invention can secure either weapon, but not both at the same time. However, the invention can be extended to yet accommodate more than one model of loaded weapon at the same time. Note that the M16, "1", here shown has an M203 grenade launcher 3 installed on the underside of the weapon's barrel, The grip stock 6 of a weapon is first placed in the cradle 4 of the invention. At this point, the clamp 5 would be engaged on the grip stock 6. Note that the magazine 7 of the M16, "1", fits through an opening 8 of the invention. Aside for providing room for such a magazine as was previously mentioned, sight of the magazine there also serves in indicating that the weapon is loaded. Top clamp 5 and cradle 4 are assembled to a central mounting frame 9. In turn, said mounting frame 9 is attached to a wall of the vehicle along with mounting and stowage system means for mounting it which also herein may be referred as the "weapon stowage and mounting system", a "weapon stowage system", a "weapon mounting means", a "weapon mounting bracket", a "multi-weapon rack", a "weapon stowage device", a "weapon rack", or a "cage means", e.g., by a tubing structure 11 and by mounting brackets 12. Means for aligning, fastening, and/or tightening, 210, 212, and 216, are also included thereon. Attached to the central mounting frame 9 are the down legs 13. The down legs allow the weight of the invention to be carried by the vehicle floor. Additionally, the down legs 13 attach the caliper grip 14 to the structure and provide secondary attachment to restrain a weapon in question. The spacing of the caliper grip 14 from the cradle 4 allows the invention to secure the weapon at the grip stock 6 and also at the hand guard 15. A toggle clamp 16 actuates and locks the caliper grip 14. The caliper grip must not be too tight, lest it deform the barrel of the weapon, nor too weak, lest it be unable to hold the weapon from flying about. Likewise the grip placed on the grip stock, like at the hand guard, must not be too tight, lest it deform or break the weapon at such locations, nor too weak, lest it be unable to hold the weapon from flying about. Securing the down legs 13 to the floor or to the metal mounting means 106 and/or floor are t-slots 17 and adjustable threaded bolts 18 which are secured in the t-slots. Shown therefore is, for a military assault weapon having a defined muzzle end, grip stock, grip stock clamp, hand guard, and caliper grip, a mounting and stowage device built permanently inside a metal mounting means which further is permanently mounted within the walls and floor of a military vehicle wherein the invention aids to physically secure the weapon emplaced therein in a down orientation wherein the muzzle end is pointed straight downward towards the floor of the vehicle, and retains such weapon as so emplaced unless purposefully removed, and serves to secure such weapon from flying about as a secondary projectile in the event of a vehicle roll over, vehicle collision or vehicle blast event. And also shown is wherein the means to secure the grip stock is accomplished with the grip stock clamp and the means to secure the hand guard is accomplished with the caliper grip. A ballistic panel of UMWPE material 41 is positioned below the vehicle's floor 102 in line with the muzzle of the weapon wherein the ballistic panel will fully capture a bullet in the event of an accidental discharge of the weapon. The invention deals with furnishing inside the interior space of a vehicle with bolted in/complex mechanical devices to grip and clamp down an assault weapon for a soldier. It may accommodate a variety of popular infantry assault weapons, fully accessoried, fully loaded with live ammunition; it has a protective bullet catching device under the vehicle floor boards thereof. It even has room to accommodate a large size ruck sack for storage purposes. It shows a very elaborate mechanical device, to grip and clamp down an assault weapon for a soldier. The attached equipment include but are not limited to, forward hand grips, M203 grenade launchers, Picatinny rails, and loaded ammunition magazines in situ. The military vehicles utilizing this invention include but are not limited to a helicopter, jeep, tank, troop carrier, Humvee, boat, airplane, or other military use vehicles.

FIG. 2 is a detailed view of the caliper grip 14 of the invention, specifically illustrating when a M249, "2", is secured, and shows a detailed section with caliper arm 19 positioned such that platen 20 clamps directly onto the side mounted Picatinny rail 21 of the M249, "2". Note that caliper arm 19 pivots about the mounting point 22. At this point, the caliper arm 19 is cantilevered. This situation will make withstanding a blast load difficult for the invention. To remediate this, a simple slider feature 23 is incorporated into the end of the caliper arm 19. The slider feature 23 relieves the cantilever loading as it slides in a slot 24.

FIG. 3 demonstrates the caliper grip 14 of the invention and illustrates a section thereof in detail with the caliper platen 20 adjusted to accommodate an M16, allowing the platen 20 to secure the hand guard thereon.

FIG. 4 depicts the caliper grip 14, specifically the adjustability which allows various types of weapons to be secured. Holes on the caliper arm 19 allow the platen 20 to be adjusted. Hole 30 is used for an M16, whereas hole 31 is used for an M249, "for example. In this figure, the caliper arms are adjusted for the M16, "1". This figure also shows that the platen 20 can pivot about a pin 32. This allows for the platen 20 to pivot about the tapered hand guard 15 of the M16, "1". Pin 33, located on either side of the pivot pin 32 keep the platen 20 from over rotating. Those familiar in the art will be able to ascertain other geometries that may fit into the limited space. However, based on the original conditions, this concept performed the best in analyses and testing.

FIG. 5 displays the invention with an M16, "1", in an only partially cutaway view of a vehicle setting. The invention is built to be firmly installed enclosed in part with aid of metal means 106 and metal ribs 108 which are attached to the vehicle, walls and floor, etc, through a plurality of attachment means 110 and 120. Such ribs and attachment means are/could also be extended and located to other places on the floor/walls (such as ribs 508 and attachment means 510 or also be attached to the ceiling of the vehicle. Yet another purpose of this view is to explain the bullet arrester aspect of the invention. The M16, "1", is secured in the invention with the muzzle end of barrel 40 extended into a catch box 41 that is located in the floor of the vehicle in this case. Also to be noted, the invention's support structure means further serves as a shelf that will hold a ruck sack 42.

While the invention may have been described with reference to certain embodiments, numerous changes, alterations and modifications to the described embodiments are possible without departing from the spirit and scope of the invention as defined in the appended claims, and equivalents thereof. Some applications include but are not limited to the following. Types of weapons commonly carried by a combat soldier which might also be adapted for storage also include side arms, rifles, shot guns, and light machine guns, etc., in conjunction with their common accessories. Accessories might come already attached on any part of the weapon not just top side or bottom side, or the accessories might be kept unattached. Accessories and attachments might include tactical lights, laser aiming modules, forward hand grips for improving weapon handling, telescopic sights for medium-ranged or distant targets, reflex sights/red-dot sights for short to medium-ranged targets, iron sight lines, bipods, bayonets, grenades, M203 grenade launcher(s attached to the weapon; the weapons could have Picatinny rails mounted thereon in addition to the/or a standard hand guard, a loaded ammunition magazine in place, with/without any of such accessories attached/held upon a base plate of the ammunition magazine as well. Stowage of the weapon may have been described as with the barrel muzzle pointing downward, but other orientations, and also pointing upwards might be accomplished. A rack might be specially fabricated for two or even more than two weapons in one rack according to the teachings of this invention. Such racks might accommodate more than one of the same type of weapon, but might also accommodate a mix of various types of weapons still carried in a single rack. These might include but not be limited to the M4, M16, M240, M249, or other models of assault weapons, or shot guns, or etc. The racks might not necessarily be in a straight alignment but might be made to fit the inside contours of a vehicle for efficient space utilization. The racks might even be on the outside of a vehicle or upon its roof. The vehicle could be sea borne or air borne in nature, and could include helicopters or air planes of various types. While military vehicles have so far been mentioned, other use vehicles might want to include racks according to this invention. They might be used in civilian government safety applications, guarding activities or law enforcement of various kinds, as well as for the afore described defense department uses.

What is claimed is:

1. A rack system comprising a military troop carrying vehicle and a weapon stowage and mounting system for a military assault weapon having a defined muzzle end, grip stock, grip stock clamp, hand guard and caliper grip, the weapon stowage and mounting system further comprising:
 a mounting frame permanently mounted within a wall and a floor of the military troop carrying vehicle and wholly within an interior of the military troop carrying vehicle;
 two down legs attached to the mounting frame and extending to the floor of said military vehicle thereby allowing the floor to support the weight of the military assault weapon, said two down legs secured to the floor via an adjustable thread bolt interfacing with a corresponding slot in the floor of the military troop carrying vehicle;
 a cradle attached to the said two down legs, said cradle for receiving the grip stock of the military assault weapon;
 a top clamp for securing the grip stock to the cradle;
 a caliper grip for receiving the hand guard of the military assault weapon, said caliper grip positioned a distance from the cradle to allow for securing the weapon at the grip stock and the hand guard simultaneously and further comprising an adjustable platen configurable for weapon type via a pin-and-hole placement;
 a toggle clamp for securing the caliper grip about the hand guard; and
 wherein the weapon stowage and mounting system physically secures the military assault weapon emplaced therein in a down orientation wherein the muzzle end is pointed straight downward towards the floor of the military troop carrying vehicle, and retains such military assault weapon as so emplaced unless purposely removed, and serves to secure such military assault weapon from flying about as a secondary projectile in the event of a vehicle roll over, vehicle collision or vehicle blast event.

2. The rack system of claim 1 wherein the weapon stowage and mounting system can accommodate an automatic weapon of various types, by adjusting the grip stock clamp and the caliper grip.

3. The rack system of claim 2 wherein the toggle clamp is positioned in relation to the caliper grip to allow for stowage of a military assault weapon with various equipment still attached to a top-side and an under-side of the military assault weapon, without need to detach any such equipment, thus allowing the military assault weapon to maintain mission specific readiness.

4. The rack system of claim 3 wherein the cradle is sized and dimensioned to allows for stowage of a military assault weapon with a loaded magazine still remaining in the military assault weapon and below the cradle, thus allowing the military assault weapon to maintain mission specific readiness.

5. The rack system of claim 4 wherein the attached equipment is selected from the group consisting of: a forward hand grips, a M203 grenade launchers, a Picatinny rails, and loaded ammunition magazines.

6. The rack system of claim 5 wherein the military troop carrying vehicle is selected from the group consisting of: a helicopter, a jeep, a tank, a personnel carrier, a Humvee, a boat, and an airplane.

7. The rack system of claim 1 wherein the rack system incorporates a ballistic panel of UMWPE material that is positioned below the vehicle's floor in line with the muzzle of the military assault weapon wherein the ballistic panel will fully capture a bullet in the event of an accidental discharge of the military assault weapon.

8. The rack system of claim 1 wherein the military assault weapon is selected from the group consisting of: an M4, an M16, an M240, and an M249.

9. The rack system of claim 8 wherein the rack system provides room for a large sized ruck sack.

* * * * *